United States Patent [19]
Cericola

[11] 3,888,475
[45] June 10, 1975

[54] AXIAL COMPONENT FORCE TRANSMITTING ARRANGEMENT

[75] Inventor: Robert F. Cericola, Greenville, S.C.

[73] Assignee: The United States of America, Washington, D.C.

[22] Filed: Feb. 27, 1974

[21] Appl. No.: 446,442

[52] U.S. Cl. ................................ 267/174; 92/130
[51] Int. Cl. ........................................... F16z 1/12
[58] Field of Search ............... 267/174 V, 114 V; 92/130 V

[56] References Cited
UNITED STATES PATENTS

| 2,833,602 | 5/1958 | Bayer | 92/130 |
| 2,996,079 | 8/1961 | Mahand et al. | 92/130 |

*Primary Examiner*—James B. Marbert
*Attorney, Agent, or Firm*—R. S. Sciascia; P. Schneider; N. Brown

[57] ABSTRACT

A force-transmitting arrangement having a self-aligning gimbal to transmit solely an axial force component from a helical spring or other linear actuator.

10 Claims, 8 Drawing Figures

PATENTED JUN 10 1975 3,888,475
SHEET 2

AXIAL COMPONENT FORCE TRANSMITTING ARRANGEMENT

BACKGROUND OF THE INVENTION

The present invention pertains to devices for applying only an axial force from a linear actuator such as a helical spring which has both axial and non-axial force components, and more particularly to mechanical oil accumulators which employ a piston-like arrangement having a piston biased by a spring force, which force is required to be primarily axial.

A governing-system employing an hydraulic actuator is often used as a means to regulate the speed of machinery in accordance with changes in load.

An oil accumulator is a device capable of supplying a large volume of oil, almost instantaneously, to a governing-system actuator and therefore may be used to compensate for surges in oil lines. Supply of oil in this manner fulfills a transient demand for a high-volume of oil flow in a very short time. The oil flow may be used to operate control valves -for example, to admit steam to a turbine or fuel to an engine. When a sudden change occurs in the work required of a machine regulated by the governing-system employing an accumulator, a sudden drop in oil pressure results, causing degraded performance of the governing system response and introducing a possibility of temporary instability, or hunting (wherein the regulating system is prevented from quickly settling down on a proper control value). To compensate for the pressure drop and resulting reduction of oil pressure, the accumulator quickly releases a quantity of oil to the governer hydraulic supply which acts to prevent deleterious effects upon system performance while the oil pressure is being restored. Thus, in effect, the accumulator is a standby device which ensures that governing system response does not become degraded when high oil flow is required in a short period of time, the requirement arising from a large step-change in load, or work, required of the machinery being regulated.

Oil accumulators are known which employ a piston head actuated by a spring arrangement which pushes against the piston head so as to force the piston into the oil-containing section. Such accumulators have a tendency to fail after a relatively short period of usage. Failure is often due to a non-uniform, viz, a non-axial spring force acting upon the piston-head at a distance from the axis of the shaft which drives the piston-head, thereby causing a tendency for the piston head to tilt and jam within the piston chamber or cylinder.

SUMMARY OF THE INVENTION

The present invention minimizes the tendency of the piston to tilt as well as minimizing the associated problems of galling and early failure of the piston within its chamber. According to the invention, this is accomplished by utilization of a self-aligning gimbal assembly between the piston and spring. The non-uniform spring force present is due to imperfect manufacturing of the spring and is applied first to a spring seat which is allowed to rotate about two axes, each perpendicular to the shaft axis and also perpendicular to each other, in a manner similar to that of a gyroscope. These two axes of rotation or various combinations of rotation about the shaft allow the spring axial-force to act through the axes of the shaft, but do not allow the moment (or lateral) forces to be transmitted to the shaft, thus lessening the tendency of the piston to tilt.

OBJECTS OF THE INVENTION

It is an object of the present invention to transmit solely an axial force from a linear actuator which may generate both axial and non-axial components of force.

It is another object of the invention to minimize the tendency of a spring-actuated piston to tilt or cock during motion in a piston chamber.

A further object is to provide an improved mechanical oil accumulator of the spring-biased piston type wherein a self-aligning gimbaling arrangement transmits substantially solely axial force to the piston with minimization of any tendency for the piston to tilt during movement within its chamber.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 5:
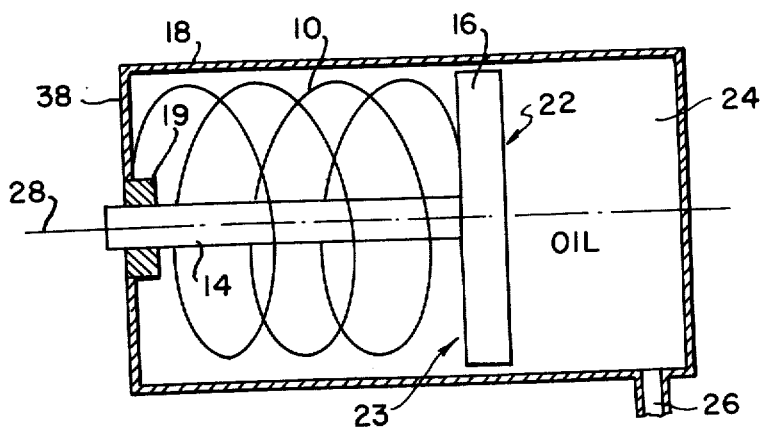
FIG. 5 is a fragmentary cross-section view of a known type of oil accumulator given to explain the problem encountered in the use of such known devices.

To aid in an understanding of the problem encountered in prior art devices such as mechanical oil accumulators, reference is made to FIG. 5 which illustrates in a fragmentary way only the essential elements of such a device. A linear actuator, appearing in the form of spring 10 acts upon the back 23 of the piston head 16. The spring 10 or linear actuator, is designed and intended to have only an axial force coincident with a shaft 14. The shaft 14 passes through a bearing 19 and is attached to the piston 16, movable within a piston chamber 18. The region 24 is used to accumulate oil. Oil flows into and out of this region 24 through a main oil port 26. Oil flows in under pressure (typically 90 pounds per square inch), causing the piston 16 to begin to move against the counteracting spring 10 (typically 4700 pound preload). As the spring 10 becomes compressed, potential energy is stored and the force exerted by the spring 10 increases proportionally to the distance it is compressed. When the force exerted by the spring becomes equal to that exerted by the oil on face 22 of the piston 16, the piston motion stops and a state of equilibrium ensues. If the oil pressure should then increase further, the piston 16 will move to further compress the spring 10 thereby storing more potential energy until the forces are again equalized and a new equilibrium state is reached. If oil pressure should drop, the stored potential energy in the spring 10 pushes upon and moves piston 16 so as to force oil out through the main oil port 26, to supply the governor until control system oil pressure is restored.

Figure 6:
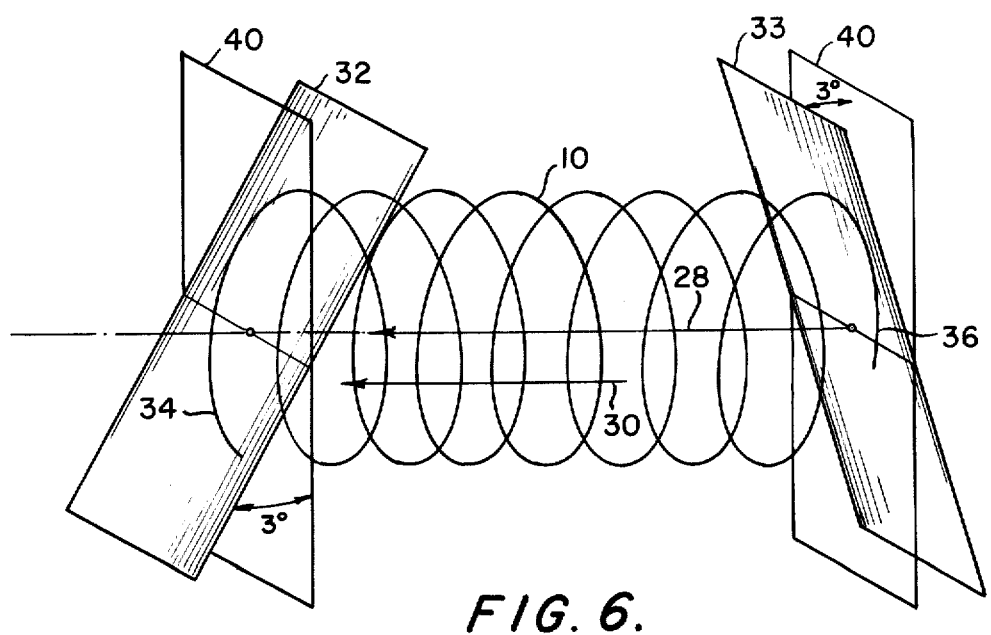
FIG. 6 is a diagram given to aid in an understanding of the forces resulting from imperfect spring construction.

An example of springs used in this application is shown pictorially in FIG. 6. They are generally large and helical (for example, 26 inches free length) in nature, and are designed and manufactured with the intent that the spring exert only an axial force acting through the center of the spring axis 28. Unfortunately, this desired effect is seldom realized. Imperfect manufacturing causes the spring to exert non-axial forces when compressed. The non-axial force in effect acts through an eccentric axis 30 parallel to and displaced from the spring axis 28. The spring force acting through the eccentric axis 30 results in a moment which has the effect of producing a tilting force which would tend to tilt the piston 16 if the spring 10 were to press directly against it, as it does in the prior art devices typically depicted in FIG. 5. This tilting, or moment, force is a significant factor in causing failure of the piston of prior-art devices due to galling and wear and subsequent seizing. Referring now to FIG. 6, eccentric spring force may be caused by imperfect manufacturing which allows the plane 32 or 33 in which an end 34 or 36 of the spring is located to be angularly displaced (typically 3 degrees) from a plane 40 normal to the spring axis. Further, the actual area of contact of the spring within the plane 32 or 33 is not uniformly distributed about the spring axis 28. Additionally, when compressed, the spring becomes displaced, causing lateral forces which are also non-axial in nature.

Figure 1:
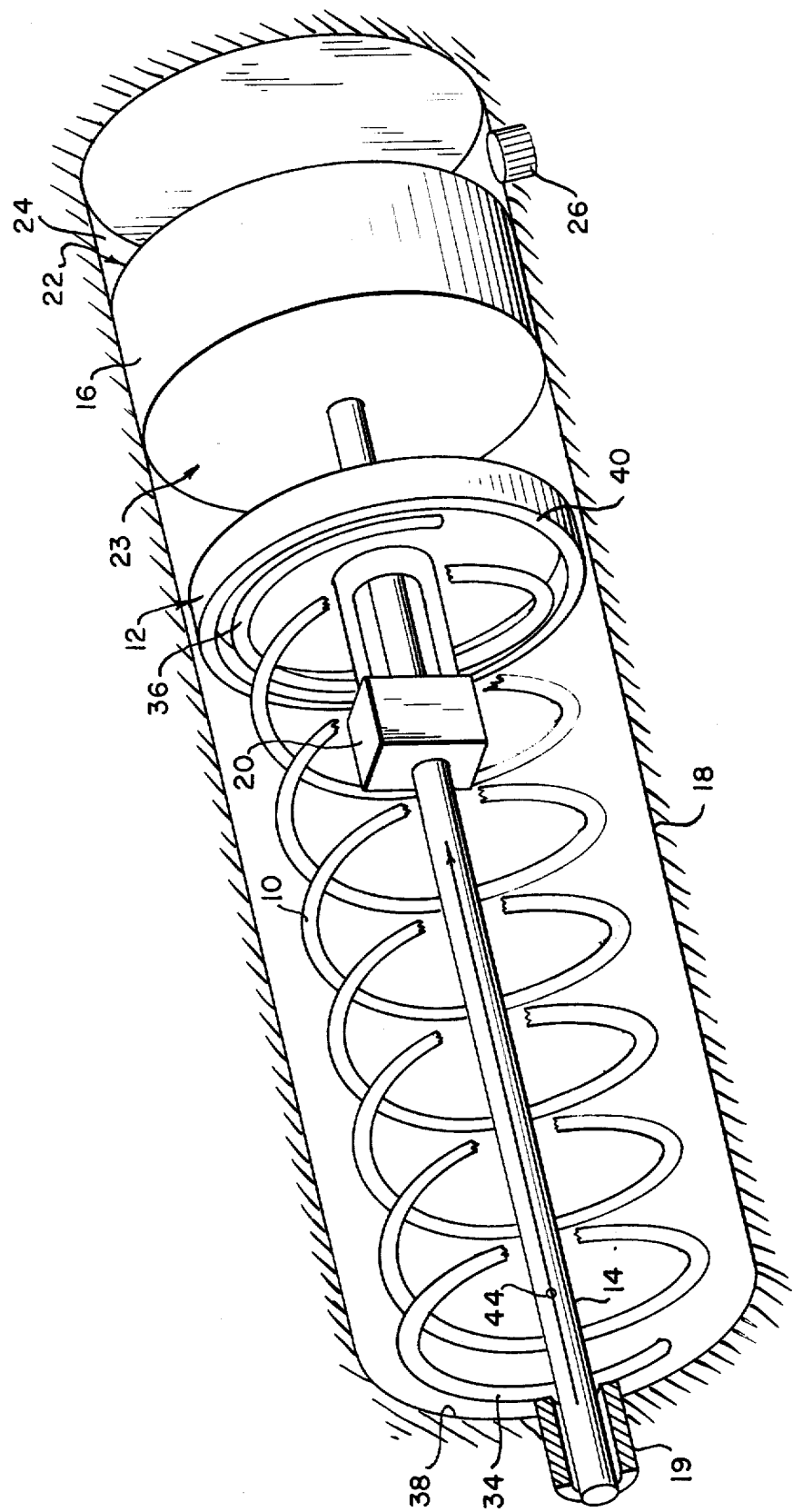
FIG. 1 is a pictorial diagram of an embodiment of the present invention.

By use of the self-aligning gimbal of the present invention, the tilting forces acting on the piston shaft can be minimized if not altogether prevented. Referring now to FIG. 1, a linear actuator (here in the form of spring 10) acts upon a spring seat 12. The spring seat 12 in the form of a hollow end-disc is coupled to the shaft 14 through a self-aligning gimbal 20. The shaft 14 passes through a central opening in the spring seat 12 so that one end of the shaft can be attached to the piston 16. Thus the spring force acts upon the shaft only through the self-aligning gimbal. The spring has one end 34 in contact with an end wall 38, and its other end 36 in contact with the spring seat 12. A retaining edge 40 surrounds the planar surface or end disc of the seat 12 to ensure that the end 36 of the spring 10 does not slip off the seat. Looking now at FIG. 2, the area of contact of the end 36 of spring 10 with the spring seat is shown in phantom at 42. For the above-described and other reasons, the non-ideal spring 10 exhibits an eccentric force along an axis such as 30 parallel to the center axis 28 shown in FIG. 6. This central axis 28 is coincident with the shaft center axis identified as 44 in FIGS. 1 and 2. It is well known that a non-axial eccentric force may be considered as the equivalent of an axial force in combination with a moment acting about on axis perpendicular to the shaft axis 44.

Figure 7A:
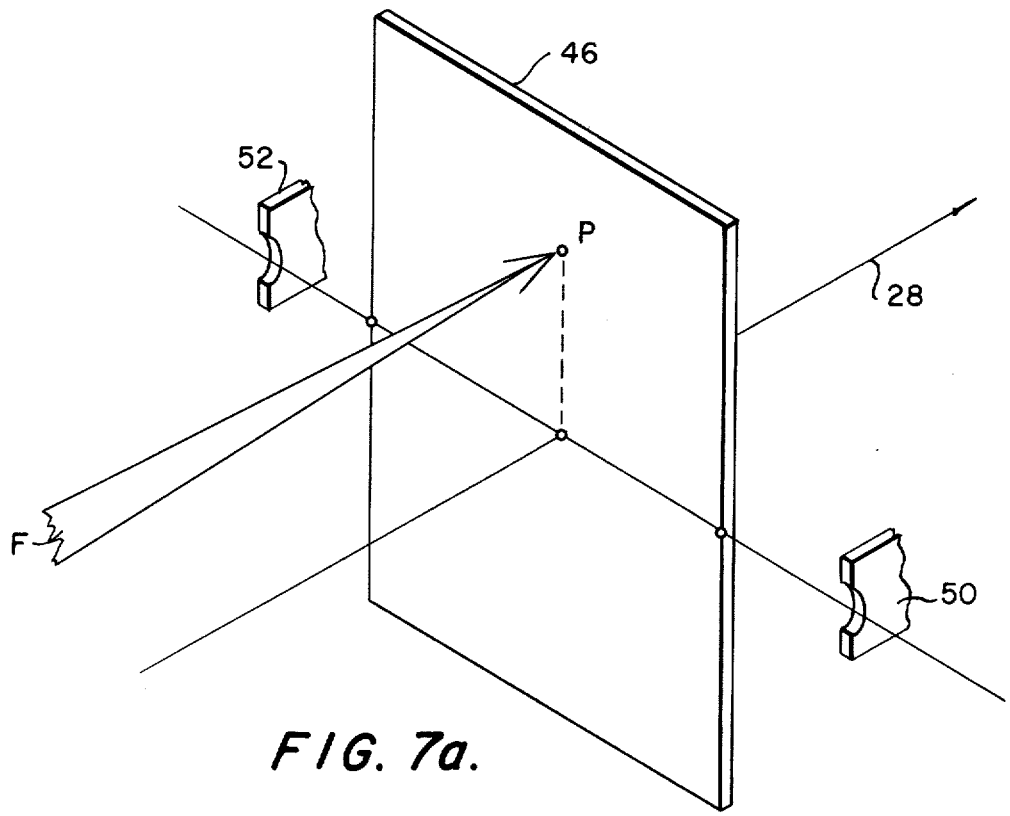
FIGS. 7a and 7b are force-diagrams to explain force-components present in the gimbaling arrangement of the present invention.
Figure 7B:
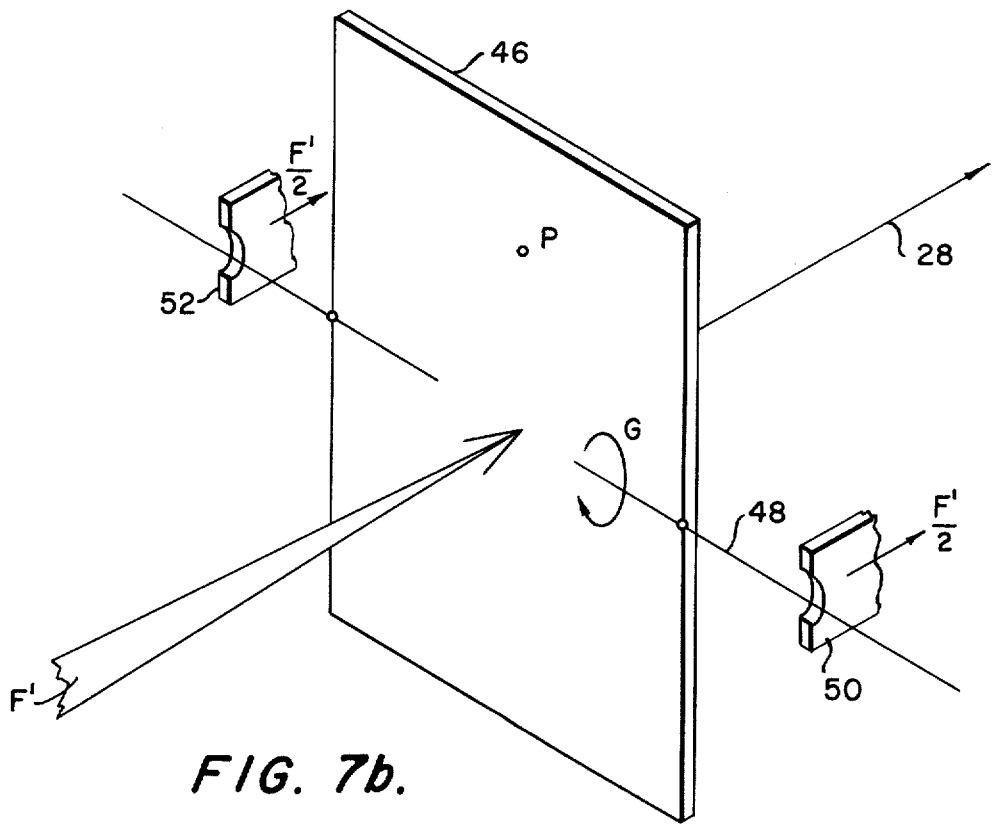

The principles underlying these load-forces will now be explained in connection with diagrams of FIGS. 7a and 7b. If a force F (FIG. 7a) bears upon a point P in a rigid plane 46, that force may be replaced with an axial force F' and moment G as shown in FIG. 7b. If the rigid plane in which point P lies is allowed to rotate about the axis 48 of the plane and in addition this axis is supported and free to move in the axial direction 28, the moment force will not be transmitted to supports 50 and 52, but one-half of the axial force F' will be transmitted to each support. In this manner it is possible to utilize only the axial component of a non-axial force from a force producing means as found in the imperfect spring employed in the embodiment of FIG. 1. A similar explanation applies to the other gimbal axis.

Figure 2:
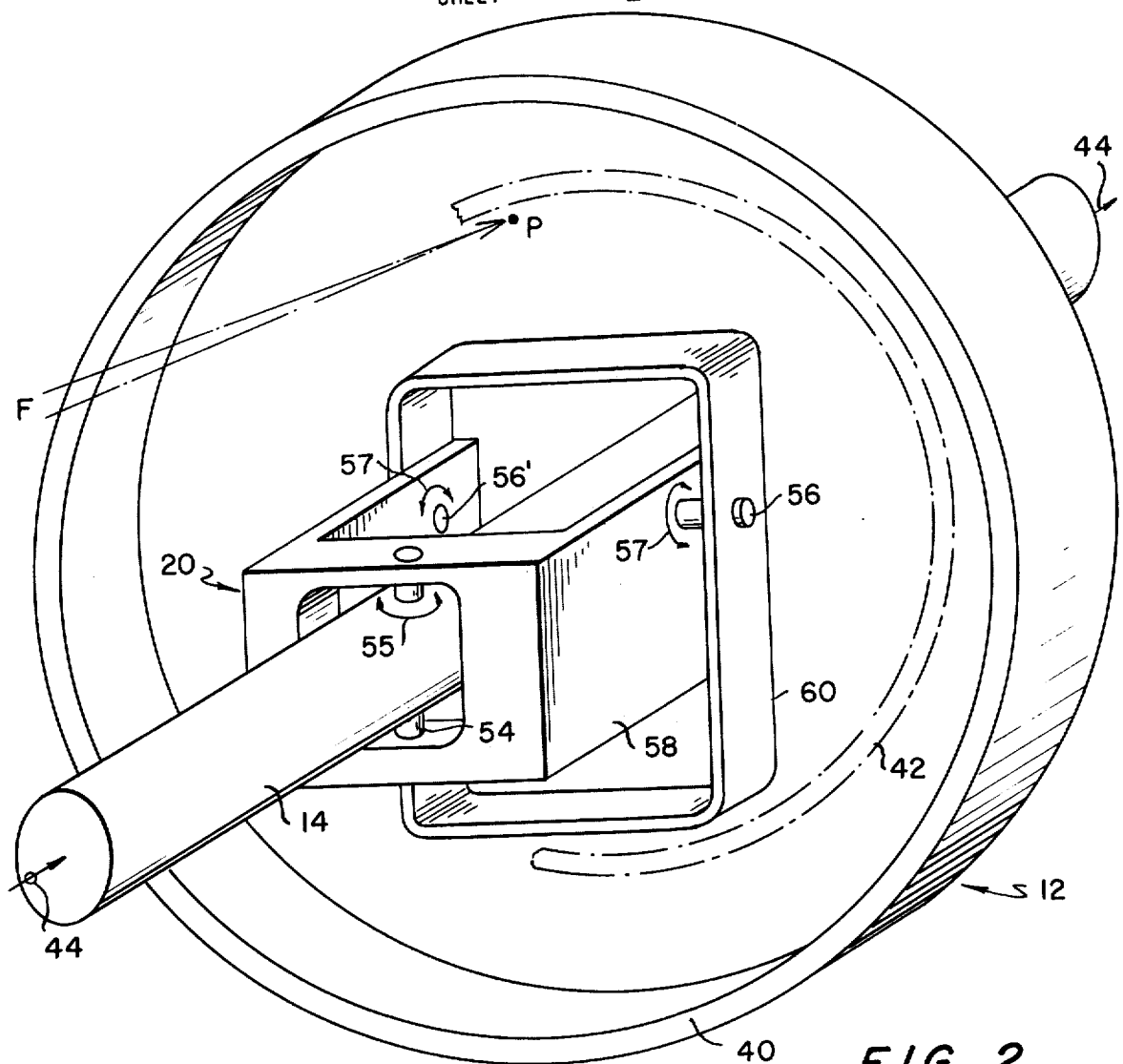
FIG. 2 is a perspective view of a self-aligning gimbal according to the present invention.
Figure 4:
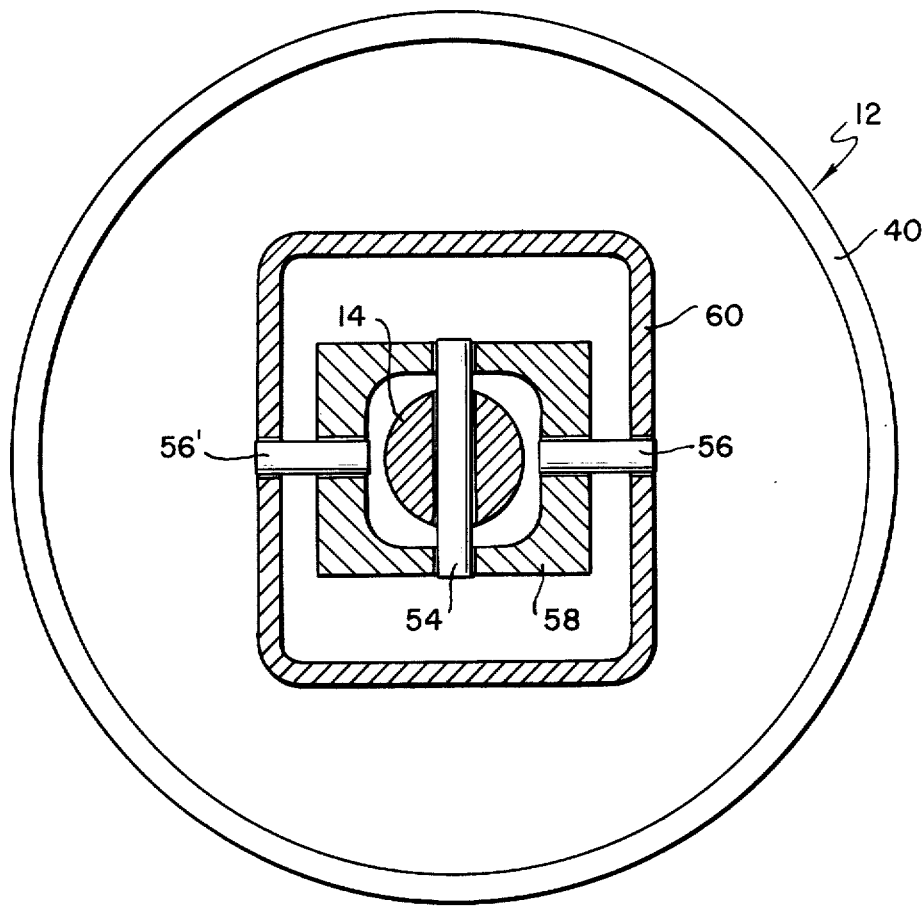
FIG. 4 is a cross-sectional end view of FIG. 2 in a plurality of planes given to illustrate how shaft, yoke, and link elements are interconnected.

The self-aligning gimbal arrangement as used in this embodiment and as depicted in FIG. 2 will provide rotation of the spring seat about any axis perpendicular to the shaft axis 44, so as to eliminate any moment force encountered in the arrangement shown in FIG. 5. The gimbal shown in FIG. 2 employs a pin connection 54 which passes through the shaft and employes individual, spaced, pin connections disposed at right angles to one another. The pin 54 connects the shaft 14 with a U-shaped yoke 58 whose arms are individually connected by the pair of spaced pins 56, 56' to a link element 60. Link element 60, shown as rectangular in shape-although it may be cylindrical in shape, is rigidly attached at its edges which contact the flat end-disc of spring seat 12 to the spring seat 12 as by welding. The pin 54 allows free rotation of the yoke element 58 about the shaft 14 in the directions indicated by arrows 55 while pin pair 56, 56' allows free rotation of the link element with its rigidly attached spring seat about the yoke element 58 in the directions indicated by arrows 57. FIG. 4 is a cross-sectional view of FIG. 2 in a plurality of planes given to illustrate more clearly how the pin 54 and the pair of pins 56, 56' connect the yoke 58 to the shaft, and the link 60 to the yoke to allow two axis of rotation about the shaft 14.

Figure 3:
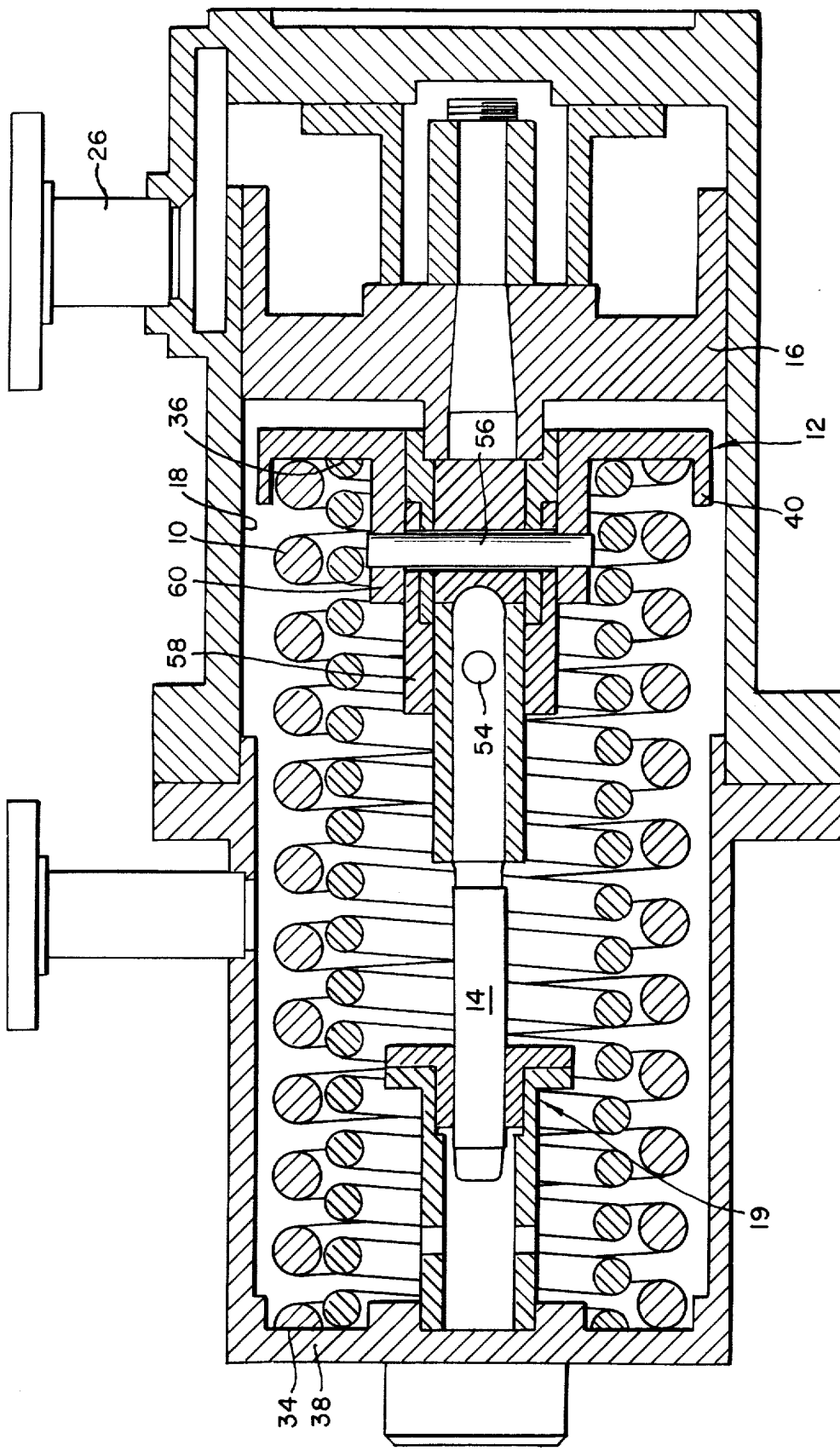
FIG. 3 is a cross-sectional view of a oil accumulator using the present invention.

A cross-sectional view of an oil accumulator utilizing the present invention is shown in FIG. 3.

It will be understood that although the previous description relates to a mechanical oil-accumulator, the invention may be applied to any mechanical device requiring the application of force in an axial direction from a linear-actuator which may apply force not only in an axial direction but in a non-axial direction as well. Modifications and variations of the present invention are possible without departing from the spirit and scope of the appended claims.

What is claimed is:

1. A device for exerting axial force upon an element adapted to move in an axial direction while minimizing non-axial force on said element comprising:
    a stationary surface disposed so that an axis perpendicular to said surface is substantially colinear with said axial direction;
    a seat disposed between said element and said stationary surface;
    a linear actuator having both axial and non-axial force components and having an intended axial force axis that is coaxial with said axial direction, said linear actuator positioned between said stationary surface and said seat,
    said linear actuator having one end engaging said stationary surface and having its other end in engaging said seat; and
    gimbal means connected between said seat and said element acting to transmit only axial components of force to said element.

2. A device according to claim 1 wherein said element is a shaft and said seat has a substantially planar surface with an opening substantially in the center thereof through which said shaft passes.

3. A device according to claim 1 wherein said linear actuator is a helical spring.

4. Means for assuring solely an axial force on a shaft adapted for reciprocating movement within a chamber comprising:
- a compressible helical spring surrounding said shaft;
- a stationary surface engaging an end of said spring;
- a spring seat engaging the other end of said spring; and
- a self-aligning gimbal attached to said spring seat and connected to said shaft.

5. A device according to claim 4 wherein said seat is a hollow end disc and said shaft passes through said seat.

6. A device according to claim 4 wherein said gimbal comprises a U-shaped yoke element having a pair of arms and a bridge portion across said arms, said bridge portion having an opening through which said shaft can freely pass and extending between said arms, a pin passing through said shaft and having its ends connected to said bridge portion, the axis of said pin being disposed perpendicularly to the axis of said shaft whereby said yoke rotates freely about the axis of said pin, said gimbal having a link element fixedly attached to said spring seat and a pair of spaced pins arranged in a straight line at right angles to the shaft and connecting the arm portions of said U-shape yoke to said link, whereby said yoke may rotate freely about the axis of said pair of said pins.

7. A device for exerting axial force upon an element adapted to move in an axial direction while minimizing non-axial force on said element comprising:
- a stationary surface disposed so that an axis perpendicular to said surface is substantially colinear with said axial direction;
- a seat disposed between said element and said stationary surface;
- a linear actuator having both axial and non-axial force components and having an intended axial force axis that is coaxial with said axial direction,
- said linear actuator positioned between said stationary surface and said seat,
- said linear actuator having one end engaging said stationary surface and having its other end engaging said seat; and
- gimbal means comprising
  - movable yoke means connected by gimbals to said element,
- link means fixedly connected to said seat means and connected by gimbals to said yoke means,
  - said gimbal connections permitting said yoke to freely rotate about the axes of said gimbals so that only the axial component of a non-axial force from said linear actuator is applied to said element.

8. A device as defined by claim 7 wherein the axis of the gimbals connecting said yoke means to said element is disposed perpendicularly to the axis of the gimbals connecting said link means to said seat means.

9. A device as defined by claim 8 wherein said element is a shaft fixedly connected at one end to an element with a flat face, the axes for both of said gimbals being disposed perpendicularly to the axis of said shaft.

10. A device as defined by claim 9 wherein said yoke means comprises a pair of parallel arms and a bridge portion therebetween, said bridge portion having an opening through which said shaft can freely pass and extend between said arms, said gimbal connecting said shaft to said yoke means comprising a pin passing through said shaft and having its ends connected to said bridge portion, the axis of said gimbal pin being disposed so that said yoke means rotates freely about the axis of said pin, said gimbal connecting said link means to said yoke means comprising a pair of spaced pins arranged in a straight line and connecting the arms of said yoke means to said links, whereby said yoke means may rotate freely about the axis of said pair of pins.

* * * * *